(12) United States Patent
Cohen

(10) Patent No.: US 10,502,649 B1
(45) Date of Patent: Dec. 10, 2019

(54) APPARATUS AND METHOD FOR TESTING COMPRESSED GAS DISPENSING STATIONS

(71) Applicant: Air Products and Chemicals, Inc., Allentown, PA (US)

(72) Inventor: Joseph Perry Cohen, Bethlehem, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

(21) Appl. No.: 16/121,781

(22) Filed: Sep. 5, 2018

(51) Int. Cl.
*G01L 11/00* (2006.01)
*B65D 83/14* (2006.01)

(52) U.S. Cl.
CPC ............ *G01L 11/002* (2013.01); *B65D 83/14* (2013.01)

(58) Field of Classification Search
CPC .............................. G01L 11/002; B65D 83/14
USPC ........................................................ 73/865.9
See application file for complete search history.

(56) References Cited

U.S. PATENT DOCUMENTS

| 6,280,408 B1 * | 8/2001 | Sipin ................... A61M 5/1483 604/65 |
| 2014/0174593 A1 | 6/2014 | Ammouri |
| 2014/0216599 A1 * | 8/2014 | Loewenthal ............ F17C 5/00 141/4 |
| 2014/0290790 A1 | 10/2014 | Mathison |
| 2016/0223510 A1 * | 8/2016 | Carteau ................ G01N 1/2035 |
| 2018/0335181 A1 * | 11/2018 | Sinding ..................... F17C 5/06 |

FOREIGN PATENT DOCUMENTS

| DE | 102016217260 A1 | 3/2017 |
| EP | 0653585 A1 | 5/1995 |
| EP | 2072844 A1 | 6/2009 |
| EP | 2527713 A1 | 11/2012 |
| EP | 2544067 A2 | 1/2013 |

OTHER PUBLICATIONS

Extended European Search Report for application EP18192716, dated Mar. 22, 2019.*
Kashuba, Michael J., "Hydrogen Field Standard, Test Program and Results to Date"; Hydrogen Dispenser Certification; Jun. 16-20, 2014; 25 pgs. USA.
"CSA Group's New Hydrogen Fueling Station Testing Trailer Provides an Efficient Testing", https://www.csagroup.org/news_or_press/csa-groups-new-hydrogen-fueling-station-testing-trailer-provides-efficient-testing-alternative-station-owners/; Nov. 6, 2017; 3 pgs.; USA.
Xiao, Jinsheng et al., "Estimation of final hydrogen temperature from refueling parameters," Int. J. of Hydrogen Energy, vol. 42, pp. 7521-7528, 2017.

(Continued)

*Primary Examiner* — Nimeshkumar D Patel
*Assistant Examiner* — Jean F Morello
(74) *Attorney, Agent, or Firm* — Matthew R. Weaver

(57) ABSTRACT

Testing apparatus and method for testing compressed gas dispensing stations where a back pressure regulator is used to imitate filling of receiving vessels without the need for receiving vessels. A mass flow sensor measures the mass of compressed gas dispensed to the testing apparatus, and a controller calculates the pressure for the back pressure regulator to imitate filling of a receiving vessel.

15 Claims, 1 Drawing Sheet

(56) References Cited

OTHER PUBLICATIONS

Simonovski, Daniele Baraldi et al., "Thermal simulations of a hydrogen storage tank during fast filling," Int. J. of Hydrogen Energy, vol. 40, pp. 12560-12571, 2015.
Bougeois, T. et al., "The temperature evolution in compressed gas filling processes: A review," Int. J. of Hydrogen Energy, vol. 43, pp. 2268-2292, 2018.
"Revised Standardized Equation for Hydrogen Gas Densities for Fuel Consumption Applications," J. of Res. Natl. Inst. Stand. Technol., vol. 113, pp. 341-350, 2008.

* cited by examiner

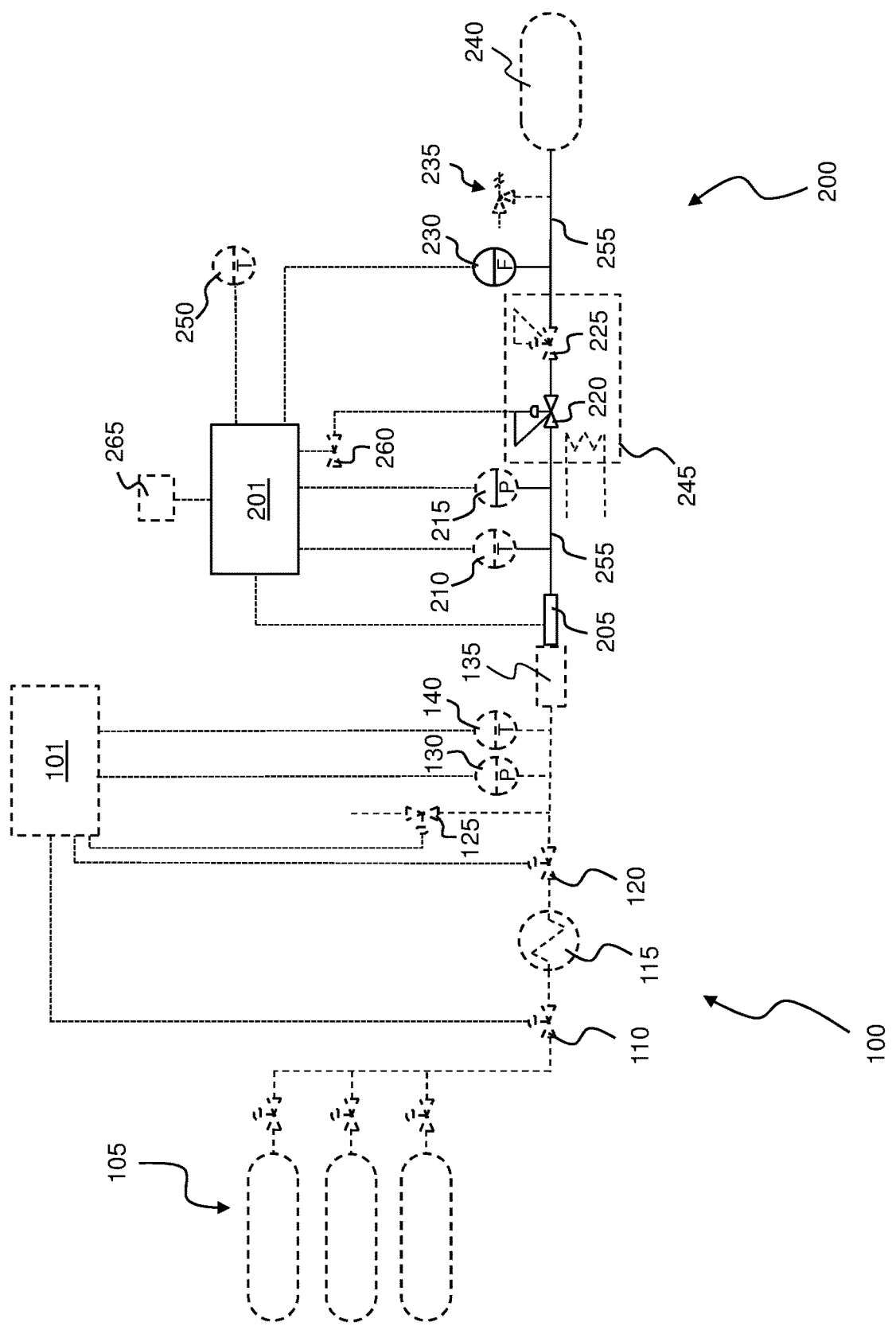

APPARATUS AND METHOD FOR TESTING COMPRESSED GAS DISPENSING STATIONS

BACKGROUND

Compressed gas dispensing stations are being developed to fill hydrogen-powered vehicles, and compressed natural gas-powered vehicles. Designs of compressed gas dispensing stations can vary from manufacturer to manufacturer.

Industry desires to test hydrogen dispensing stations and compressed natural gas (CNG) dispsensing stations.

Industry desires to test compressed gas dispensing stations under varying conditions. Some conditions desired for testing may not be practical at the present time. For example, industry may desire to test a hydrogen or CNG dispensing station for conditions where hydrogen or CNG is dispensed to multiple vehicles in rapid succession, but a large number of vehicles are not available. Industry may desire to test a hydrogen or CNG dispensing station for various prescribed initial pressures in the receiving vessel, where receiving vessels with the prescribed initial pressures are not available. Industry may desire to test a hydrogen or CNG dispensing station for various receiving vessel volumes, where receiving vessels with the prescribed volumes are not available.

BRIEF SUMMARY

The present disclosure relates to a testing apparatus and method for compressed gas dispensing stations.

There are several aspects of the invention as outlined below. In the following, specific aspects of the invention are outlined below. The reference numbers and expressions set in parentheses are referring to an example embodiment explained further below with reference to the figures. The reference numbers and expressions are, however, only illustrative and do not limit the aspect to any specific component or feature of the example embodiment. The aspects can be formulated as claims in which the reference numbers and expressions set in parentheses are omitted or replaced by others as appropriate.

Aspect 1. A testing apparatus for a compressed gas dispensing station, the testing apparatus comprising:
 a receptacle (205) for providing a sealing connection with a dispensing nozzle (135) of a compressed gas dispensing station;
 a fluid transfer line (255) having an upstream end and a downstream end, the upstream end attached to the receptacle (205);
 a back pressure regulator (220) in the fluid transfer line (255), the back pressure regulator (220) operatively disposed to control the pressure of a gas in the fluid transfer line (255) upstream of the back pressure regulator (220), the back pressure regulator (220) operatively configured to be responsive to a control signal corresponding to a representative fill pressure from a controller (201);
 a mass flow sensor (230) in the fluid transfer line (255), the mass flow sensor (230) operatively disposed to measure a value relatable to a quantity of gas transferred in the fluid transfer line (255) and provide a signal in response thereto; and
 the controller (201), the controller (201) operatively connected to the mass flow sensor (230), the controller (201) configured to calculate the representative fill pressure using the signal from the mass flow sensor (230), the controller operatively configured to provide the control signal corresponding to the representative fill pressure.

Aspect 2. The testing apparatus according to aspect 1 further comprising:
 a temperature sensor (210) operatively disposed to measure a value relatable to a temperature of the gas in the fluid transfer line (255) upstream of the back pressure regulator (220) and provide a signal in response thereto;
 wherein the controller (201) is operatively connected to the temperature sensor (210) and configured to calculate the representative fill pressure also using the signal from the temperature sensor (210).

Aspect 3. The testing apparatus according to aspect 1 or aspect 2 further comprising:
 an ambient air temperature sensor (250) operatively disposed to measure a value relatable to a local air temperature and provide a signal in response thereto;
 wherein the controller (201) is operatively connected to the ambient air temperature sensor (250) and configured to calculate the representative fill pressure also using the signal from the ambient air temperature sensor (250).

Aspect 4. The testing apparatus according to aspect 1 or aspect 2 further comprising:
 a user input device (265) for entering parameter values for use by the controller (201).

Aspect 5. The testing apparatus according to any one of aspects 1 to 4 further comprising:
 a forward pressure regulator (225) in the fluid transfer line (255), the forward pressure regulator (225) operatively disposed downstream of the back pressure regulator (220), the forward pressure regulator (225) operatively disposed to control the pressure of the gas in the fluid transfer line (255) downstream of the forward pressure regulator (225).

Aspect 6. The testing apparatus according to any one of aspects 1 to 5 further comprising:
 a heating device (245) to provide heat to at least back pressure regulator (220).

Aspect 7. The testing apparatus according to any one of aspects 1 to 6 further comprising:
 a pressure sensor (215) operatively disposed to measure a value relatable to a pressure of the gas in the fluid transfer line (255) upstream of the back pressure regulator (220) and provide a signal in response thereto;
 wherein the controller (201) is operatively connected to the pressure sensor (215).

Aspect 8. The testing apparatus according to any one of aspects 1 to 7 further comprising:
 one or more receiving vessels (240), wherein the one or more receiving vessels (240) are operatively connected to the downstream end of the fluid transfer line (255).

Aspect 9. The testing apparatus according to any one of aspect 1 to 8 wherein the compressed gas is hydrogen.

Aspect 10. A method for testing a compressed gas dispensing station, the method comprising:
 connecting a dispensing nozzle (135) of the compressed gas dispensing station to a receptacle (205) of a testing apparatus, the testing apparatus comprising a fluid transfer line (255) with a back pressure regulator (220) operatively disposed in the fluid transfer line (255), the back pressure regulator having a pressure setting that is adjustable;
 passing a quantity of compressed gas from the dispensing nozzle (135) through the fluid transfer line (255);

measuring a value relatable to the mass of the quantity of compressed gas passed through the fluid transfer line (255);

calculating a representative fill pressure from the value relatable to the mass of the quantity of compressed gas passed through the fluid transfer line (255); and adjusting the pressure setting of the back pressure regulator (220) in the fluid transfer line (255) responsive to the calculated representative fill pressure.

Aspect 11. The method according to aspect 10 further comprising:

measuring a value relatable to compressed gas temperature of the quantity of compressed gas passing through the fluid transfer line (255) at a location upstream of the back pressure regulator (220);

wherein the representative fill pressure is calculated also from the value relatable to the compressed gas temperature.

Aspect 12. The method according to aspect 10 or aspect 11 further comprising:

measuring a value relatable to a local air temperature;

wherein the representative fill pressure is calculated also from the value relatable to the local air temperature.

Aspect 13. The method according to aspect 10 or aspect 11 wherein the representative fill pressure is calculated using one or more user-provided values for one or more respective parameters, the one or more parameters selected from the group consisting of local air temperature, initial gas pressure, and representative receiving vessel volume.

Aspect 14. The method according to any one of aspects 10 to 13 wherein the quantity of compressed gas is passed in the fluid transfer line (255) from the back pressure regulator (220) to a forward pressure regulator (225) to adjust the pressure of the quantity of compressed gas downstream of the forward pressure regulator (225).

Aspect 15. The method according to any one of aspects 10 to 14 wherein the back pressure regulator (220) is heated.

Aspect 16. The method according to any one of aspects 10 to 15 wherein the quantity of compressed gas is passed from the fluid transfer line (255) to one or more receiving vessels (240).

Aspect 17. The method according to any one of aspect 10 to 16 wherein the compressed gas is hydrogen.

BRIEF DESCRIPTION OF SEVERAL VIEWS OF THE DRAWINGS

The FIGURE shows a schematic of a compressed gas dispensing station and a testing apparatus for a compressed gas dispensing station.

DETAILED DESCRIPTION OF THE PREFERRED EMBODIMENTS

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention, it being understood that various changes may be made in the function and arrangement of elements without departing from the scope of the invention as defined by the claims.

The articles "a" and "an" as used herein mean one or more when applied to any feature in embodiments of the present invention described in the specification and claims. The use of "a" and "an" does not limit the meaning to a single feature unless such a limit is specifically stated. The article "the" preceding singular or plural nouns or noun phrases denotes a particular specified feature or particular specified features and may have a singular or plural connotation depending upon the context in which it is used.

The adjective "any" means one, some, or all indiscriminately of whatever quantity.

The term "and/or" placed between a first entity and a second entity includes any of the meanings of (1) only the first entity, (2) only the second entity, and (3) the first entity and the second entity. The term "and/or" placed between the last two entities of a list of 3 or more entities means at least one of the entities in the list including any specific combination of entities in this list. For example, "A, B and/or C" has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

The phrase "at least one of" preceding a list of features or entities means one or more of the features or entities in the list of entities, but not necessarily including at least one of each and every entity specifically listed within the list of entities and not excluding any combinations of entities in the list of entities. For example, "at least one of A, B, or C" (or equivalently "at least one of A, B, and C" or equivalently "at least one of A, B, and/or C") has the same meaning as "A and/or B and/or C" and comprises the following combinations of A, B and C: (1) only A, (2) only B, (3) only C, (4) A and B and not C, (5) A and C and not B, (6) B and C and not A, and (7) A and B and C.

"Downstream" and "upstream" refer to the intended flow direction of the process fluid transferred. If the intended flow direction of the process fluid is from the first device to the second device, the second device is in downstream fluid flow communication of the first device. In case of a recycle stream, downstream and upstream refer to the first pass of the process fluid.

The present disclosure relates to a testing apparatus and method for a compressed gas dispensing station, for example a hydrogen dispensing station. The testing apparatus and method will be described with reference to the sole FIGURE showing dispensing station components 100 and testing apparatus components 200.

The dispensing station components shown in the FIGURE include one or more storage vessels 105 for supplying compressed gas to the testing apparatus, a pressure control valve 110 to control the pressure increase of compressed gas being dispensed, a heat exchanger 115 to cool the compressed gas that is dispensed, a block valve 120, a bleed valve 125, a pressure sensor 130, a dispensing nozzle 135, and a controller 101. The dispensing station may comprise any known components of a compressed gas dispensing station. The dispensing station may be a fixed station or a mobile station.

The testing apparatus comprises a receptacle 205. Receptacle 205 is suitable for providing a sealing connection with a dispensing nozzle 135 of a compressed gas dispensing station. Receptacle 205 has the same structure as a receptacle of a hydrogen-powered vehicle for the case where $H_2$ is dispensed. Receptacle 205 is the counterpart or companion mating device to dispensing nozzle 135 of a compressed gas dispensing station. The receptacle may include an IR transmitter or similar device for providing information such as receiving vessel volume, temperature, and pressure from the testing apparatus to the compressed gas dispensing station. The IR transmitter or similar device may be equivalent to the device used to transmit temperature and pressure information from a vehicle to a compressed gas dispensing station for a so-called "communication fill."

The testing apparatus comprises a fluid transfer line 255. The fluid transfer line 255 has an upstream end and a downstream end. The upstream end of the fluid transfer line 255 is attached to the receptacle 205.

The testing apparatus comprises a back pressure regulator 220 in the fluid transfer line 255. The back pressure regulator 220 is operatively disposed to control the pressure of a gas in the fluid transfer line 255 upstream of the back pressure regulator 220. The back pressure regulator 220 is operatively configured to be responsive to a control signal corresponding to a representative fill pressure, $P_{repr}$, from controller 201. The back pressure regulator 220 may be, for example, a Tescom 26-1760-66 back pressure regulator.

The back pressure regulator 220 may be operatively configured to be responsive to the control signal via a current to pressure transducer 260, such as a Ronon X-55 current to pressure transducer.

The testing apparatus comprises a mass flow sensor 230 in the fluid transfer line 255. As used herein, the term "mass flow sensor" includes any device that can be used to determine the mass flow rate in the fluid transfer line, and includes within its scope a "mass flow meter." The mass flow sensor 230 is operatively disposed to measure a value relatable to a quantity of gas transferred in the fluid transfer line 255 and provide a signal in response thereto. The mass flow sensor 230 may be, for example, a Rheonic RHM-04 mass flow sensor.

The term "relatable" means to have a direct relation, association, correspondence, or connection with.

The testing apparatus comprises controller 201. Controller 201 is operatively connected to the mass flow sensor 230. Controller 201 is configured to calculate the representative fill pressure, $P_{repr}$, using the signal from the mass flow sensor 230. The controller is operatively configured to provide the control signal corresponding to the representative fill pressure, $P_{repr}$.

The controller 201 may calculate the representative fill pressure from a cumulative mass of gas (eg. hydrogen gas) that has passed through the mass flow sensor 230 using an equation of state for the gas. Preferably, a non-ideal gas (real gas) equation of state is used to calculate the representative fill pressure. Any suitable real gas model may be used, for example, the Redlich-Kwong model, Virial model, or Peng-Robinson model. Alternatively, National Institute of Standards (NIST) values may be used (cf. "Revised Standardized Equation for Hydrogen Gas Densities for Fuel Consumption Applications," *J. of Res. Natl. Inst. Stand. Technol.*, Vol. 113, pp 341-350, 2008).

The volume used to calculate the representative fill pressure may be set to a fixed value for the calculation of representative fill pressure, or a value may be entered using a user input device 265. This same value for the volume may be transmitted to the dispensing station via an IR transmitter in the receptacle 205. Intentional erroneous signals may be transmitted as part of the dispenser testing to see how the dispenser responds.

Accordingly, the apparatus may comprise user input device 265 for entering parameter values for use by controller 201. The user input device 265 may be any known user input device known in the art, for example, a mouse, keyboard, touch pad, touch screen, and the like.

The initial pressure for calculating the representative fill pressure may be set to a fixed value or a value may be entered using user input device 265.

The temperature, $T_{in}$, of the gas introduced into the fluid transfer line 255 may be set to a fixed value or measured using temperature sensor 210. The testing apparatus may comprise temperature sensor 210. If present, temperature sensor 210 is operatively disposed to measure a value relatable to a temperature of the gas in the fluid transfer line 255 upstream of the back pressure regulator 220 and provide a signal in response thereto. If the temperature sensor 210 is present, controller 201 is operatively connected to temperature sensor 210 and the controller 201 is configured to calculate the representative fill pressure also using the signal from the temperature sensor 210.

The calculated representative fill pressure, $P_{repr}$, may also depend on the local air temperature, $T_{local}$. The local air temperature, $T_{local}$, may correspond to the ambient air temperature in the vicinity of the testing apparatus. The local air temperature can affect the temperature of a receiving vessel due to heat transfer between the receiving vessel and its surroundings. The local air temperature may correspond to an air temperature in the immediate vicinity of the testing apparatus and may be measured using temperature sensor 250.

Accordingly, the testing apparatus may comprise temperature sensor 250 operatively disposed to measure a value relatable to a local air temperature, $T_{local}$, and provide a signal in response thereto. If the temperature sensor 250 is present, controller 201 is operatively connected to temperature sensor 250 and the controller 201 is configured to calculate the representative fill pressure also using the signal from the temperature sensor 250.

Alternatively, the local air temperature, $T_{local}$, used for the calculation of the representative fill pressure can be a fixed value or a value may be entered using user input device 265.

The representative temperature, $T_{repr}$, used for calculating the representative fill pressure, $P_{repr}$, may be calculated by the controller 201 using an empirical equation or based upon theoretical equations.

Several publications describe the calculation of the representative temperature based upon thermodynamic principles, for example, Bourgeois et al., "The temperature evolution in compressed gas filling processes: A review," *Int. J. of Hydrogen Energy*, vol. 43, pp. 2268-2292, 2018; Xiao et al., "Charge-discharge cycle thermodynamics for compression hydrogen storage system," *Int. J. of Hydrogen Energy*, vol. 41, pp 5531-5539, 2016; Xiao et al., "Estimation of final hydrogen temperature from refueling parameters," *Int. J. of Hydrogen Energy*, vol. 42, pp 7521-7528, 2017; Simonovski et al., "Thermal simulations of a hydrogen storage tank during fast filling," *Int. J. of Hydrogen Energy*, vol. 40, pp. 12560-12571, 2015.

Alternatively, historical data acquired from dispensing hydrogen to many receiving vessels can be used to develop empirical equations such as:

$$T_{repr} = ((273 + T_{fill}) \times (C_1 \times \ln(P_{ramp-rate}) + C_2)) - 273 + \left(\left(\left(273 + T_{ambient}\right) \times \frac{\left(\frac{P_{repr}}{P_{start}}\right)}{\left(C_3 \times \left(\frac{P_{repr}}{P_{start}}\right) + C_4\right)}\right) - (273 + T_{ambient})\right) - C_5$$

where $T_{ambient}$ is the local air temperature in ° C.;
$C_1$, $C_2$, $C_3$, $C_4$, and $C_5$ are empirically derived constants;

$P_{repr}$ is the representative fill pressure at t=n−1;
$P_{start}$ is the pressure at the start of the simulated fill;
$T_{fill}$ is the gas temperature measured by temperature sensor 210 in ° C.;
$P_{ramp\text{-}rate}$ is the rate of pressure rise over the time of the simulated fill (MPa/min); and
$T_{repr}$ is the calculated tank temperature in ° C.

The representative fill pressure, $P_{repr}$, and representative temperature, $T_{repr}$, may be calculated in time steps. The representative fill pressure may be calculated using the representative temperature for the previous time step or the representative fill pressure may be calculated using the representative temperature for the previous time step.

In case of a "communication fill," the representative fill pressure calculated by the controller 201 and optionally the representative temperature may be transmitted to the controller of the compressed gas fueling station. The data for the pressure and optionally the temperature may be transmitted using the same protocol (i.e. SAE J2799 transmission protocol) used for dispensing compressed gas to vehicles, i.e. through an IR transmitter in the compressed gas fueling coupling comprising the receptacle 205. The data may be received by the compressed gas dispensing station via an IR receiver in the compressed gas fueling coupling comprising the dispensing nozzle 135.

The testing apparatus may comprise a forward pressure regulator 225 in the fluid transfer line 255 positioned downstream of the back pressure regulator 220. The forward pressure regulator 225 is operatively disposed to control the pressure of the gas in the fluid transfer line 255 downstream of the forward pressure regulator 225. The set point pressure for the forward pressure regulator 225 may be set manually or through controller 201.

The mass flow sensor 230 may be located downstream of the optional forward pressure regulator 225 in order to reduce the pressure rating requirements for the mass flow sensor 230.

Hydrogen dispensed from a hydrogen dispensing station is often cooled to a temperature well below ambient temperature (e.g. to −40° C.) due to heating of the hydrogen as it is expanded in a receiving vessel in order to avoid overheating of the receiving vessel.

Since very cold hydrogen passing through back pressure regulator 220 may affect the operation of the back pressure regulator 220, the apparatus may comprise a heating device 245 to provide heat to the back pressure regulator 220. The heating device may be a electrical resistance heater, heat exchanger, or any other suitable device that can provide heating to the back pressure regulator 220.

The heating device may also heat forward pressure regulator 225, if present.

The apparatus may comprise a pressure sensor 215 operatively disposed to measure a value relatable to a pressure of the gas in the fluid transfer line 255 upstream of the back pressure regulator 220 and provide a signal in response thereto. If the pressure sensor 215 is present, the controller 201 is operatively connected to the pressure sensor 215. The pressure sensor 215 can be used to improve the control of the back pressure regulator 220 by providing a feedback signal.

The testing apparatus may comprise one or more receiving vessels 240 to capture the compressed gas dispensed from the compressed gas dispensing station.

The one or more receiving vessels 240 may be operatively connected to the downstream end of the fluid transfer line 255. The one or more receiving vessels 240 may be vessels on board a tube trailer. One or more pressure relief valves 235 may be installed in the fluid transfer line 255.

Alternatively, the downstream end of the fluid transfer line 255 may be connected to a vent line (not shown) or a flare (not shown).

The present disclosure also relates to a method for testing a compressed gas dispensing station.

The method comprises connecting a dispensing nozzle 135 of the compressed gas dispensing station to a receptacle 205 of a testing apparatus. The testing apparatus comprises a fluid transfer line 255 with a back pressure regulator 220 operatively disposed in the fluid transfer line 255. The back pressure regulator has a pressure setting that is adjustable.

The method comprises passing a quantity of compressed gas from the dispensing nozzle 135 through the fluid transfer line 255.

The method comprises measuring a value relatable to the mass of the quantity of compressed gas passed through the fluid transfer line 255. The value relatable to the mass of the quantity of compressed gas passed through the fluid transfer line 255 may be determined from mass flow sensor 230 where the mass flow sensor provides a signal in response to measuring the value.

The method comprises calculating a representative fill pressure from the value relatable to the mass of the quantity of compressed gas passed through the fluid transfer line 255. The representative fill pressure may be calculated by controller 201. The controller 201 may be configured to calculate the representive fill pressure using the signal from the mass flow sensor 230.

The representative fill pressure is a function of a representative receiving vessel volume, the value relatable to the mass of the quantity of compressed gas passed through the fluid transfer line 255, an initial gas pressure, and an incoming compressed gas temperature. The incoming compressed gas temperature may be measured or entered manually using a user input device 265.

The method comprises adjusting the pressure setting of the back pressure regulator 220 in the fluid transfer line 255 responsive to the calculated representative fill pressure. The controller 201 may be operatively configured to provide a control signal corresponding to the calculated representative fill pressure. The back pressure regulator 220 may be operatively configured to be responsive to the control signal. Since compressed gas passing through the fluid transfer line 255 may be cooled prior to being passed to fluid transfer line 255, the back pressure regulator may be heated.

The method may comprise measuring a value relatable to compressed gas temperature of the quantity of compressed gas passing through the fluid transfer line 255 at a location upstream of the back pressure regulator 220. In case the value relatable to the compressed gas temperature of the quantity of compressed gas is measured, the representative fill pressure is calculated also from the value relatable to the compressed gas temperature.

The representative fill pressure may also be a function of the local air temperature, which may be measured on entered manually using a user input device 265.

The method may comprise measuring a value relatable to a local air temperature. In case the value relatable to the local air temperature is measured, the representative fill pressure is calculated also from the value relatable to the local air temperature.

The method may comprise passing the quantity of compressed gas from the back pressure regulator 220 to a forward pressure regulator 225 to adjust the pressure of the quantity of compressed gas downstream of the forward pressure regulator 225. The forward pressure regulator 225 may be positioned upstream of the mass flow sensor 230 in order to reduce the pressure rating requirements for the mass flow sensor 230.

The method may comprise passing the quantity of compressed gas from the fluid transfer line 255 to one or more receiving vessels 240.

I claim:

1. A testing apparatus for a compressed gas dispensing station, the testing apparatus comprising:
   a receptacle for providing a sealing connection with a dispensing nozzle of a compressed gas dispensing station;
   a fluid transfer line having an upstream end and a downstream end, the upstream end attached to the receptacle;
   a back pressure regulator in the fluid transfer line, the back pressure regulator operatively disposed to control the pressure of a gas in the fluid transfer line upstream of the back pressure regulator, the back pressure regulator operatively configured to be responsive to a control signal corresponding to a representative fill pressure from a controller;
   a mass flow sensor in the fluid transfer line, the mass flow sensor operatively disposed to measure a value relatable to a quantity of gas transferred in the fluid transfer line and provide a signal in response thereto; and
   the controller, the controller operatively connected to the mass flow sensor, the controller configured to calculate the representative fill pressure using the signal from the mass flow sensor, the controller operatively configured to provide the control signal corresponding to the representative fill pressure.

2. The testing apparatus according to claim 1 further comprising:
   a temperature sensor operatively disposed to measure a value relatable to a temperature of the gas in the fluid transfer line upstream of the back pressure regulator and provide a signal in response thereto;
   wherein the controller is operatively connected to the temperature sensor and configured to calculate the representative fill pressure also using the signal from the temperature sensor.

3. The testing apparatus according to claim 1 further comprising:
   an ambient air temperature sensor operatively disposed to measure a value relatable to a local air temperature and provide a signal in response thereto;
   wherein the controller is operatively connected to the ambient air temperature sensor and configured to calculate the representative fill pressure also using the signal from the ambient air temperature sensor.

4. The testing apparatus according to claim 1 further comprising:
   a user input device for entering parameter values for use by the controller.

5. The testing apparatus according to claim 1 further comprising:
   a forward pressure regulator in the fluid transfer line, the forward pressure regulator operatively disposed downstream of the back pressure regulator, the forward pressure regulator operatively disposed to control the pressure of the gas in the fluid transfer line downstream of the forward pressure regulator.

6. The testing apparatus according to claim 1 further comprising:
   a heating device to provide heat to at least back pressure regulator.

7. The testing apparatus according to claim 1 further comprising:
   a pressure sensor operatively disposed to measure a value relatable to a pressure of the gas in the fluid transfer line upstream of the back pressure regulator and provide a signal in response thereto;
   wherein the controller is operatively connected to the pressure sensor.

8. The testing apparatus according to claim 1 further comprising:
   one or more receiving vessels, wherein the one or more receiving vessels are operatively connected to the downstream end of the fluid transfer line.

9. A method for testing a compressed gas dispensing station, the method comprising:
   connecting a dispensing nozzle of the compressed gas dispensing station to a receptacle of a testing apparatus, the testing apparatus comprising a fluid transfer line with a back pressure regulator operatively disposed in the fluid transfer line, the back pressure regulator having a pressure setting that is adjustable;
   passing a quantity of compressed gas from the dispensing nozzle through the fluid transfer line;
   measuring a value relatable to the mass of the quantity of compressed gas passed through the fluid transfer line;
   calculating a representative fill pressure from the value relatable to the mass of the quantity of compressed gas passed through the fluid transfer line; and
   adjusting the pressure setting of the back pressure regulator in the fluid transfer line responsive to the calculated representative fill pressure.

10. The method according to claim 9 further comprising:
    measuring a value relatable to compressed gas temperature of the quantity of compressed gas passing through the fluid transfer line at a location upstream of the back pressure regulator;
    wherein the representative fill pressure is calculated also from the value relatable to the compressed gas temperature.

11. The method according to claim 9 further comprising:
    measuring a value relatable to a local air temperature;
    wherein the representative fill pressure is calculated also from the value relatable to the local air temperature.

12. The method according to claim 9 wherein the representative fill pressure is calculated using one or more user-provided values for one or more respective parameters, the one or more parameters selected from the group consisting of local air temperature, initial gas pressure, and representative receiving vessel volume.

13. The method according to claim 9 wherein the quantity of compressed gas is passed in the fluid transfer line from the back pressure regulator to a forward pressure regulator to adjust the pressure of the quantity of compressed gas downstream of the forward pressure regulator.

14. The method according to claim 9 wherein the back pressure regulator is heated.

15. The method according to claim 9 wherein the quantity of compressed gas is passed from the fluid transfer line to one or more receiving vessels.

* * * * *